(12) United States Patent
Murakami

(10) Patent No.: US 12,509,009 B2
(45) Date of Patent: Dec. 30, 2025

(54) BATTERY CONTROL DEVICE, CONTROL METHOD, AND NON-TRANSITORY STORAGE MEDIUM

(71) Applicant: TOYOTA JIDOSHA KABUSHIKI KAISHA, Toyota (JP)

(72) Inventor: Makoto Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 18/297,746

(22) Filed: Apr. 10, 2023

(65) Prior Publication Data

US 2024/0010143 A1 Jan. 11, 2024

(30) Foreign Application Priority Data

Jul. 11, 2022 (JP) ................. 2022-111402

(51) Int. Cl.
*B60R 16/033* (2006.01)
*G01R 31/3842* (2019.01)
*G01R 31/392* (2019.01)
*H02J 7/00* (2006.01)

(52) U.S. Cl.
CPC ........ *B60R 16/033* (2013.01); *G01R 31/3842* (2019.01); *G01R 31/392* (2019.01); *H02J 7/0063* (2013.01)

(58) Field of Classification Search
CPC .............. B60R 16/033; G01R 31/3842; G01R 31/392; G01R 31/007; H02J 7/0063; B60L 3/0084; B60L 50/60; B60L 58/10; B60L 2240/547; B60L 2240/549
See application file for complete search history.

(56) References Cited

U.S. PATENT DOCUMENTS

2014/0195097 A1* 7/2014 Yamanaka ............. B60L 50/16
                                                    180/65.21
2016/0064776 A1   3/2016 Ro
2019/0198945 A1* 6/2019 Machida .............. H02J 7/0016
(Continued)

FOREIGN PATENT DOCUMENTS

DE    102018218485 A1 * 4/2020 ............ H01M 10/48
DE    112022003251 T5 * 4/2024 ............ B60L 3/0023
JP    2009-166549 A1685    7/2009
(Continued)

OTHER PUBLICATIONS

DE-112022003251-T5_translated (Year: 2024).*
(Continued)

*Primary Examiner* — Lisa M Caputo
*Assistant Examiner* — Michael J Singletary
(74) *Attorney, Agent, or Firm* — Oblon, McClelland, Maier & Neustadt, L.L.P.

(57) ABSTRACT

A battery control device for controlling a battery connected to a power supply line via a relay, the battery control device comprising: a detection unit that detects a predetermined signal; and a control unit that, based on detection of a predetermined signal, activates a predetermined function when it is determined that any one of at least three predetermined activation conditions is satisfied, and stops a predetermined function when it is determined that all three activation conditions are not satisfied.

9 Claims, 5 Drawing Sheets

(56) References Cited

U.S. PATENT DOCUMENTS

2021/0311124 A1 10/2021 Takahashi et al.
2024/0278741 A1* 8/2024 Nakaguchi ............... H02H 7/20

FOREIGN PATENT DOCUMENTS

| JP | 6733256 B2 * | 7/2020 | |
|----|---|---|---|
| JP | 2021-166442 A | 10/2021 | |
| JP | 7115362 B2 * | 8/2022 | .......... H01M 10/482 |
| WO | WO 2019/031274 A1 | 2/2019 | |

OTHER PUBLICATIONS

JP-7115362-B2_translated (Year: 2022).*
DE-102018218485-A1_translated (Year: 2020).*
JP-6733256-B2_translated (Year: 2020).*

* cited by examiner

BATTERY CONTROL DEVICE, CONTROL METHOD, AND NON-TRANSITORY STORAGE MEDIUM

CROSS-REFERENCE TO RELATED APPLICATION

This application claims priority to Japanese Patent Application No. 2022-111402 filed on Jul. 11, 2022, incorporated herein by reference in its entirety.

BACKGROUND

1. Technical Field

The present disclosure relates to a battery control device that controls a battery mounted on a vehicle, a control method, and a non-transitory storage medium.

2. Description of Related Art

Japanese Unexamined Patent Application Publication No. 2021-166442 (JP 2021-166442 A) discloses a battery diagnosis device for diagnosing a state of a battery mounted on a vehicle. In the battery diagnosis device described in JP 2021-166442 A, it is determined that the vehicle is parked based on the state of an ignition switch, and a diagnosis process of the battery is performed.

SUMMARY

In order to suppress a decrease in the power storage rate of the battery during parking, it is desirable that the activated battery diagnosis device be stopped after the state of the battery is diagnosed. Parking of the vehicle can be determined by the ignition switch being turned off.

However, there are vehicles in which the state of the ignition switch cannot be directly detected by the battery diagnosis device. Therefore, there is room for studying the control of activating and stopping the battery diagnosis device in such a vehicle.

The present disclosure has been made in view of the above issues, and an object of the present disclosure is to provide a battery control device, a control method, and a non-transitory storage medium capable of suppressing a decrease in the power storage rate of the battery even when the state of the ignition switch cannot be directly detected.

A battery control device according to a first aspect of the present disclosure is a battery control device that controls a battery connected to a power supply line via a relay. The battery control device includes:
 a detection unit that detects a predetermined signal; and
 a control unit that activates a predetermined function when determination is made that any one of at least three predetermined activation conditions is satisfied, and stops the predetermined function when determination is made that all the three activation conditions are not satisfied, based on detection of the predetermined signal.

With the battery control device according to the present disclosure described above, even when the state of the ignition switch cannot be directly detected, it is possible to suppress a decrease in the power storage rate of the battery because the predetermined function can be activated and stopped based on the three activation conditions.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The battery control device of the present disclosure performs activation and deactivation by detecting a signal other than the state of the ignition switch. Therefore, it is possible to suppress a decrease in the power storage rate of the battery without directly detecting the state of the ignition switch.

Hereinafter, an embodiment of the present disclosure will be described in detail with reference to the drawings.

Embodiment

Configuration

Figure 1:
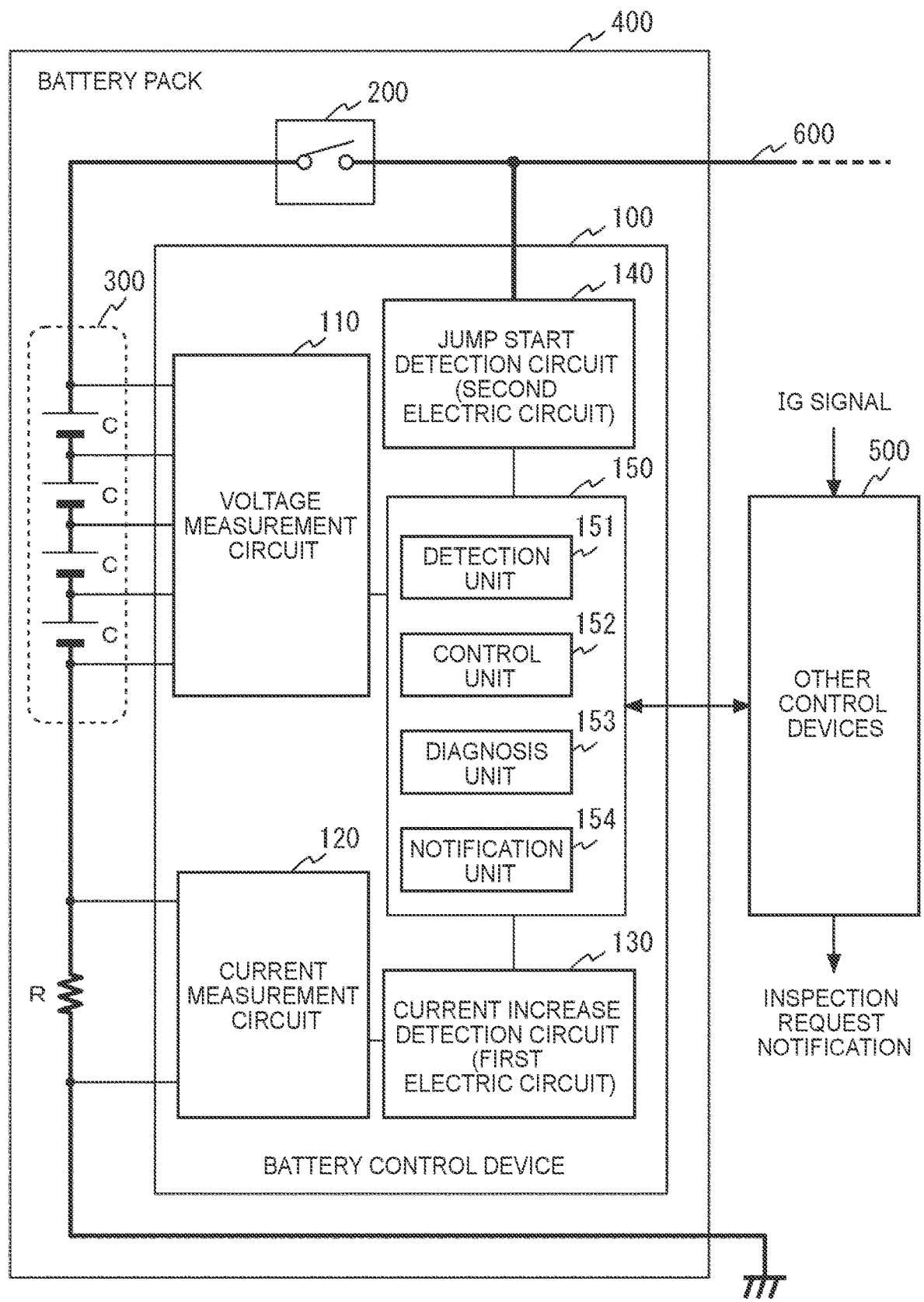
FIG. 1 is a functional block diagram of a battery control device and a peripheral portion thereof according to the present embodiment.

FIG. 1 is a functional block diagram of a battery control device 100 and a peripheral portion thereof according to an embodiment of the present disclosure. The functional blocks illustrated in FIG. 1 include a battery pack 400 including a battery control device 100, a relay 200, and a battery 300, and another control device 500. The battery pack 400 is used, for example, in an automobile using an internal combustion engine as a power source or in a battery electric vehicle (BEV) where an electric motor is used as a power source, plug-in hybrid electric vehicle (PHEV), or the like.

The battery 300 is a battery for supplying electric power to the power supply line 600 of the vehicle via the relay 200. For example, the battery 300 can be configured by connecting a plurality of cells C of a secondary battery such as a lithium-ion battery (LiB) configured to be chargeable and dischargeable in series. The battery 300 can be used as a so-called auxiliary battery that is used to supply power to a device that is not involved in driving a vehicle.

The relay 200 is a switching device capable of switching between a conduction state (ON) in which the contact is electrically connected and a non-conduction state (OFF) in which the contact is electrically disconnected. As the relay 200, for example, a normally-on single-pole single-throw mechanical relay can be used. The relay 200 is provided between the battery 300 and the power supply line 600, and switches the connection state (conduction/non-conduction) of the relay 200 under the control of the battery control device 100.

The other control device 500 is an electronic control unit (such as an HV-ECU) that controls the hybrid-type driving of vehicles. The other control device 500 can communicate with the battery control device 100 using a LIN. The other control device 500 receives an IG signal indicating the state of the ignition switch, and outputs a communication signal based on the state of the ignition switch to the battery control device 100. Further, the other control device 500 can request the meter ECU or the like to perform inspection based on the diagnostic result of the circuit related to the activation notified from the battery control device 100.

The battery control device 100 can control the state of the relay 200 and the state of the battery 300, and can also control the state of activation and deactivation of functions of itself. The battery control device 100 includes a voltage measurement circuit 110, a current measurement circuit 120, a current increase detection circuit 130, a jump start detection circuit 140, and a control circuit 150.

The voltage measurement circuit 110 is a circuit (VB) for measuring the voltage of the battery 300, more specifically, the voltage of the respective battery cells C constituting the battery 300. A device such as a voltage sensor (not shown) is used for measuring the voltage. The measured voltage of the battery 300 is used by the control circuit 150.

The current measurement circuit 120 is a circuit (TB) for measuring the current of the battery 300, specifically, the current flowing out of the battery 300 and the current flowing into the battery 300. A device such as a current sensor (not shown) capable of detecting a current flowing through the load R inserted in series with the battery 300 is used for measuring the current. The current measurement circuit 120 is configured by hardware so as to be able to measure a current regardless of the state of activation/deactivation of the control circuit 150. The measured current of the battery 300 is output to the current increase detection circuit 130.

The current increase detection circuit 130 is a circuit (first electric circuit) for inputting a current measurement value of the battery 300 from the current measurement circuit 120 and detecting an increase/decrease change in the outflow current of the battery 300. Specifically, the current increase detection circuit 130 detects whether or not the outflow current of the battery 300 is equal to or greater than a predetermined first threshold value. The current increase detection circuit 130 is configured by hardware so as to be able to detect a change in current regardless of the state of activation/stop of the control circuit 150. The content detected by the current increase detection circuit 130 is output to the control circuit 150.

The jump start detection circuit 140 is a circuit (second electric circuit) for inputting a voltage value of the power supply line 600 that is a terminal voltage of the battery control device 100 and detecting a state in which a jump start is performed based on a change in the voltage value. Here, the jump start means that an external charger (not shown) is connected to the power supply line 600 instead of the battery 300 in order to start the vehicle in a situation where the relay 200 is shut off due to the occurrence of an abnormality in the battery 300. Specifically, the jump start detection circuit 140 detects whether or not the voltage of the power supply line 600 is equal to or higher than a second predetermined threshold value. The jump start detection circuit 140 is configured by hardware so that a change in voltage can be detected regardless of the state of activation/deactivation of the control circuit 150. The content detected by the jump start detection circuit 140 is output to the control circuit 150.

The control circuit 150 is a circuit for controlling the state of the relay 200 and the state of the battery 300 based on information obtained from the voltage measurement circuit 110, the current measurement circuit 120, the current increase detection circuit 130, and the jump start detection circuit 140. The control circuit 150 includes a detection unit 151, a control unit 152, a diagnosis unit 153, and a notification unit 154.

The detection unit 151 can detect a predetermined signal input to the control circuit 150. Examples of the signal detected by the detection unit 151 include a signal indicating a current value of the battery 300 output from the current increase detection circuit 130, a signal indicating a voltage value of the power supply line 600 output from the jump start detection circuit 140, and a communication signal transmitted from another control device 500 to be described later.

In addition to controlling the states of the relay 200 and the battery 300, the control unit 152 can perform control to suitably transition between an activation state (wake-up) in which all functions are activated and a stop state (sleep) in which only some functions are activated and the remaining functions are stopped in order to suppress power consumption. Some of the functions of operating even in the stopped state can be exemplified by a function of accepting an output of the current increase detection circuit 130, a function of accepting an output of the jump start detection circuit 140, a function of accepting a communication signal (for example, a signal by LIN communication) transmitted from the other control device 500, and the like.

The diagnosis unit 153 can diagnose a circuit related to the activation after the ignition switch of the vehicle is turned off (IG-OFF). Specifically, the diagnosis unit 153 diagnoses the current increase detection circuit 130 and the jump start detection circuit 140 as a circuit related to activation. Examples of the diagnosis include an abnormality in which the output of the current increase detection circuit 130 is fixed in a state where the outflow current of the battery 300 is high or low (state fixation), and an abnormality in which the output of the jump start detection circuit 140 is fixed in a state where the voltage of the power supply line 600 is high or low (state fixation). Then, when the diagnosis unit 153 determines that an abnormality has occurred in the circuit related to the activation, it invalidates the activation condition that is affected by the abnormality.

The activation condition is a condition for activating a part of the functions that have been stopped in order to suppress the power consumption to set the activation state (wakeup). The activation condition may include that the outflow current of the battery 300 output from the current increase detection circuit 130 is equal to or greater than the first threshold value, that the voltage of the power supply line 600 output from the jump start detection circuit 140 is equal to or greater than the second threshold value, and that a signal for starting LIN communication is inputted from the other control device 500. Alternatively, an arrival of a timing at which the state of the battery 300 periodically determined by the timer is checked, which is performed when the ignition switch is in the off state (IG-OFF), may be set as the activation condition.

The notification unit 154 can notify the other control device 500 or the like of the diagnosis result (normal/abnormal) of the circuit related to the activation performed in the diagnosis unit 153. LIN communication or the like is used for this notification.

The battery control device 100 described above may be configured as an electronic control unit (such as an accessory LiBECU) that typically includes a processor, such as a microcomputer, memories, and input/output interfaces. The electronic control unit realizes all or a part of the functions of the control circuit 150 and the like by the processor reading and executing the program stored in the memory.

Control

[1] Start/Stop Control

Figure 2:
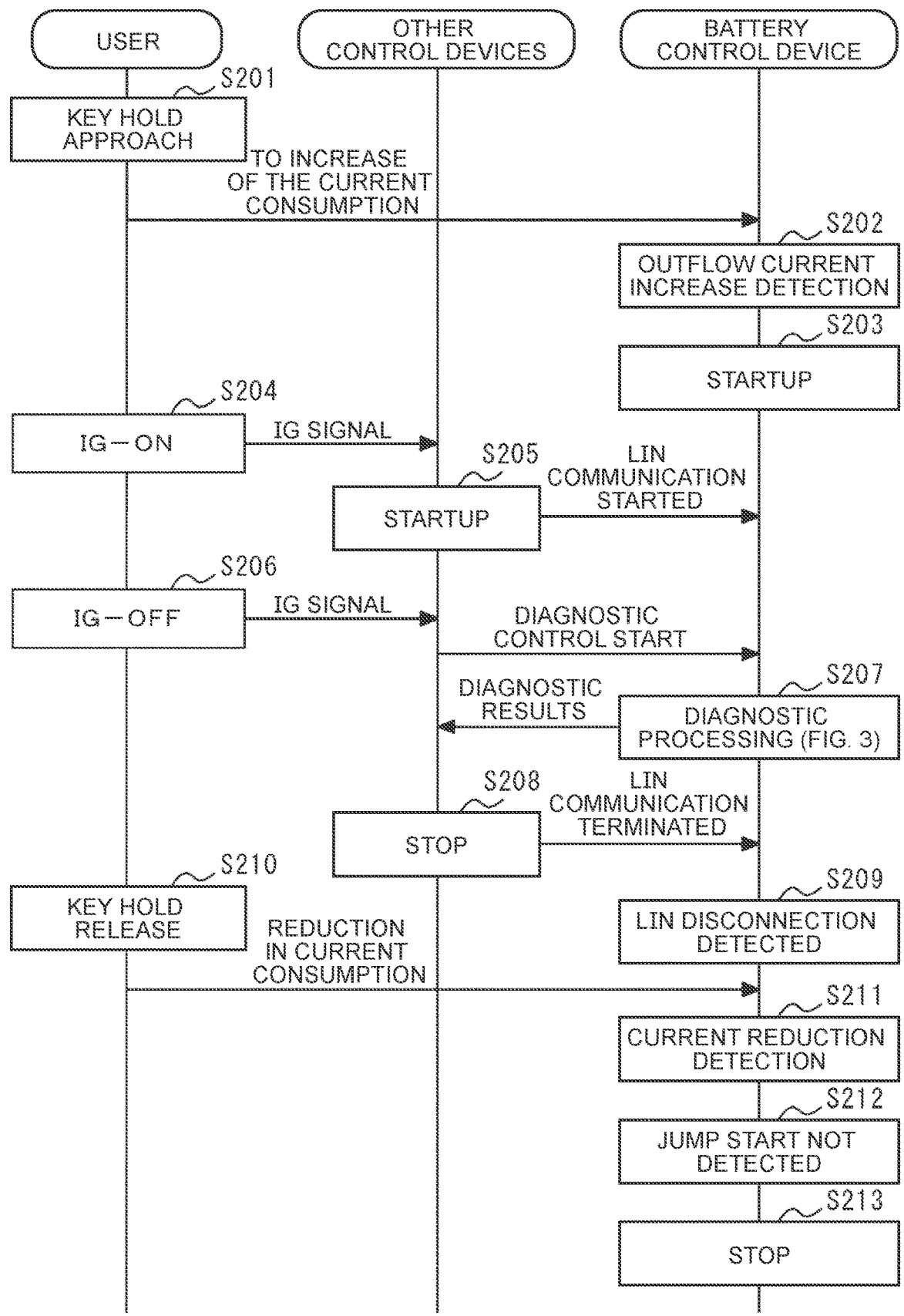
FIG. 2 is a timing chart illustrating a first start-stop control pattern.
Figure 3:
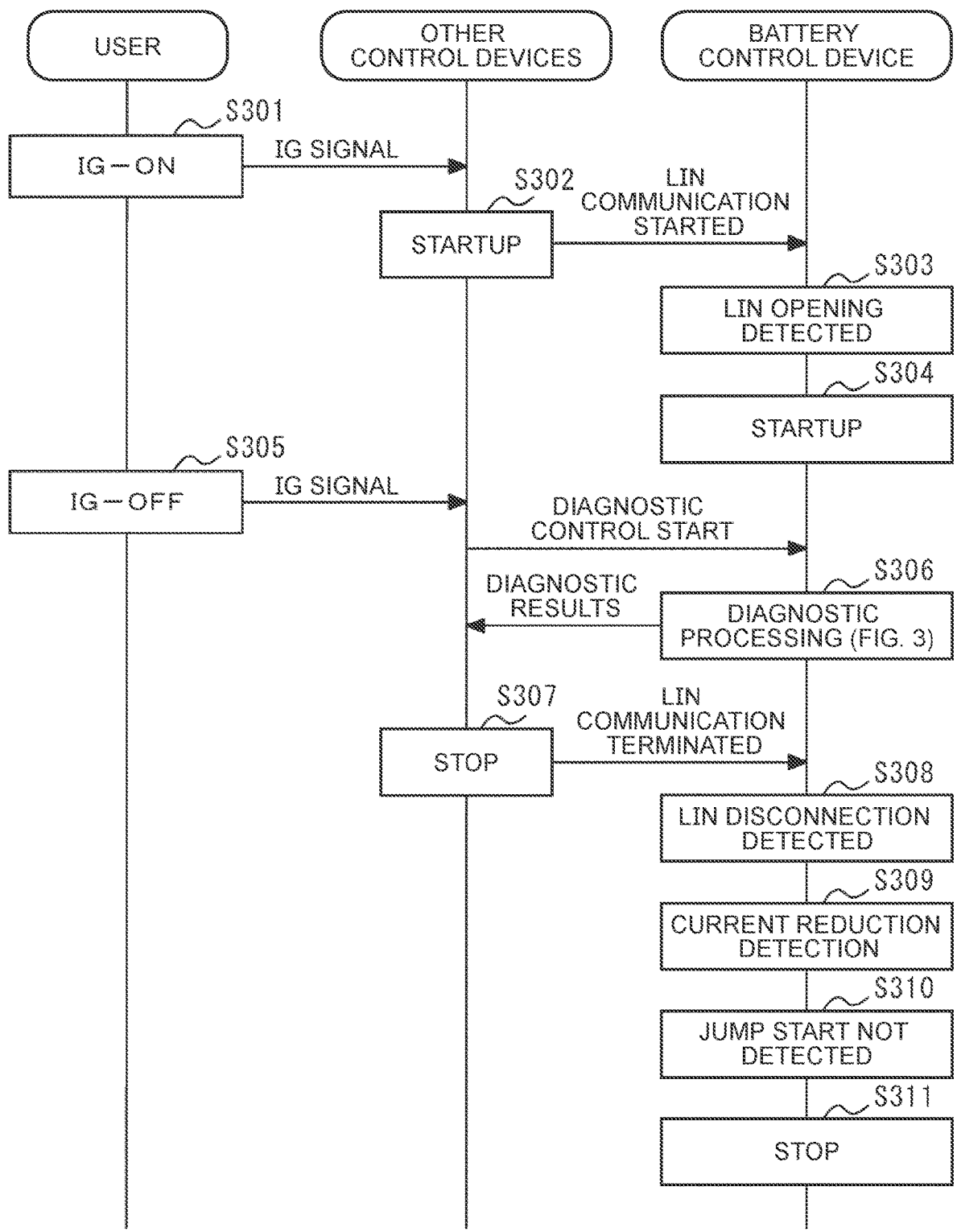
FIG. 3 is a timing chart illustrating a second start/stop control pattern.
Figure 4:
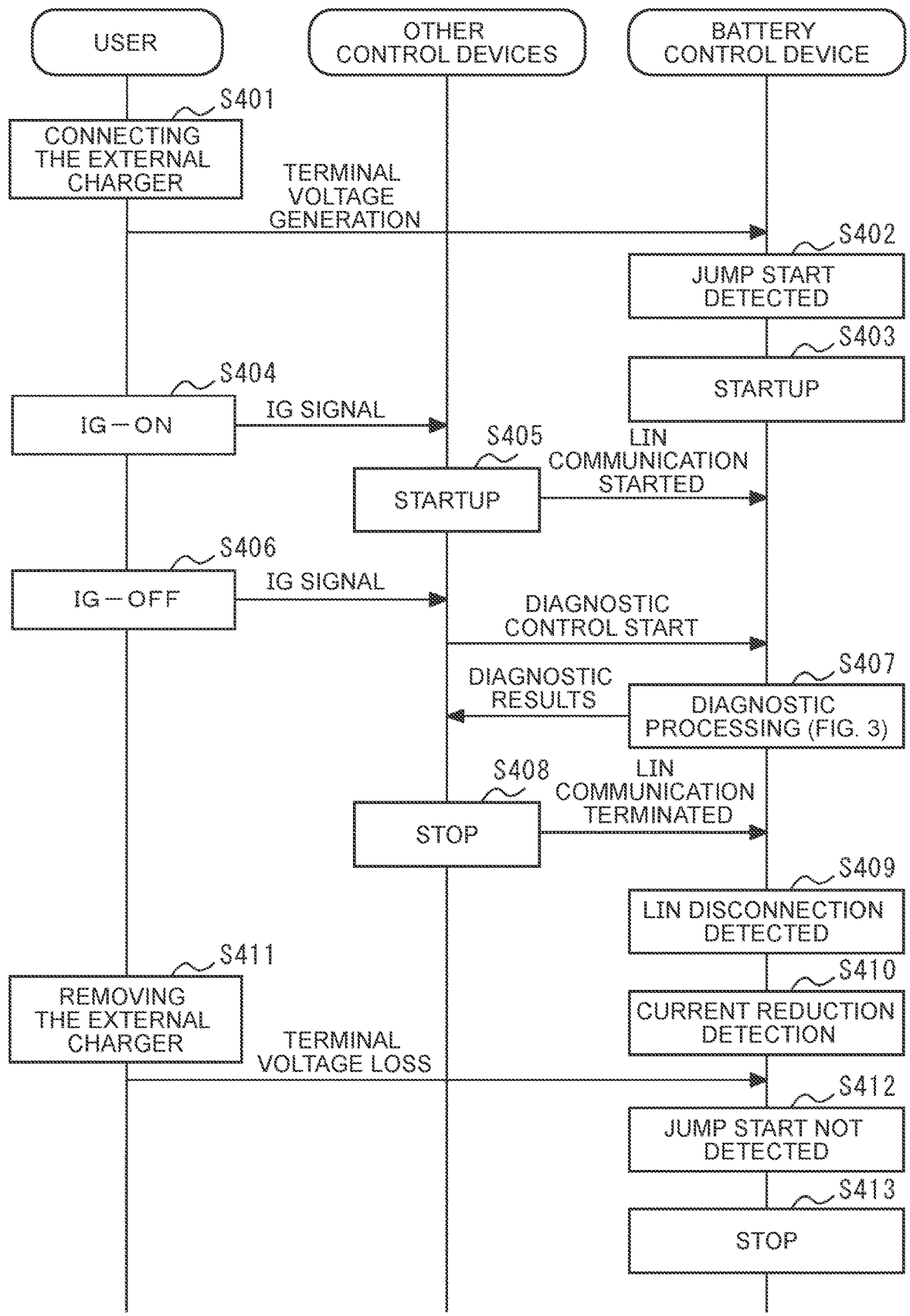
FIG. 4 is a timing chart illustrating a third start-stop control pattern.

With further reference to FIG. 2, FIG. 3, and FIG. 4, some of the activation and deactivation controls performed by the battery control device 100 according to the present embodiment will be described.

[1-1] First Start-Stop Control Pattern

FIG. 2 is a timing chart for explaining the first start/stop control pattern by the control circuit 150. This first start-stop control pattern is triggered by a change in the outflow current of the battery 300.

S201 of Steps

A user of the vehicle, such as a driver, carries an electronic key and approaches the vehicle. In accordance with this approach operation, ID is checked between the vehicles and the electronic keys, and the indoor lighting is performed based on the merits of the verification and synthesis, so that a predetermined electronic control unit (ECU) connected to the power supply line 600 consumes current. Accordingly, the current flowing out (supplied) from the battery 300 to the power supply line 600 increases.

S202 of Steps

When the current flowing out (supplied) from the battery 300 to the power supply line 600 becomes equal to or larger than the first threshold value, an increase in the outflow current is detected by the current increase detection circuit 130. The detection result is acquired by the control circuit 150.

S203 of Steps

The control circuit 150 recognizes that the outflow current of the battery 300 becomes equal to or larger than the first threshold value, and causes the control circuit to transition from the stop state (sleep) to the start state (wake-up) to activate all the functions. Thus, even when the state of the ignition switch cannot be directly detected, the control circuit 150 can be activated.

S204 of Steps

In order to use the vehicle, when the user turns on the ignition switch (IG-ON), an IG signal indicating IG-ON is inputted to the other control device 500.

S205 of Steps

The other control device 500 is activated in response to IG indicating IG-ON. The other activated control device 500 starts LIN communication with the control circuit 150 of the battery control device 100 via an in-vehicle network such as LIN.

S206 of Steps

In order to terminate the use of the vehicle, when the user turns off the ignition switch (IG-OFF), an IG indicating IG-OFF is inputted to another control device 500. In response to IG indicating IG-OFF, the other control device 500 notifies the control circuit 150 of the battery control device 100 to start the diagnostic control of the circuit related to the activation.

S207 of Steps

The control circuit 150 performs diagnostic control of the circuit related to the activation, and notifies the result of the diagnosis to the other control device 500. The diagnosis control will be described later with reference to FIG. 5.

S208 of Steps

The other control device 500 notifies the control circuit 150 of the battery control device 100 of the termination of LIN communication via the in-vehicle network after receiving the diagnosis of the circuit related to the activation from the control circuit 150, and stops its own operation.

S209 of Steps

The control circuit 150 detects LIN disconnection in response to a notification that LIN communication received from the other control device 500 is terminated.

S210 of Steps

After finishing using the vehicle, the user carrying the electronic key moves away from the vehicle. In response to this separation operation, ID verification and other processes performed between the vehicles and the electronic keys are eliminated, and therefore, the current consumed by the predetermined electronic control unit (ECU) connected to the power supply line 600 disappears. Accordingly, the current flowing out (supplied) from the battery 300 to the power supply line 600 is reduced.

S211 of Steps

When the current flowing out (supplied) from the battery 300 to the power supply line 600 becomes less than the first threshold value, a decrease in the outflow current is detected by the current increase detection circuit 130. This detection result is obtained by the control circuit 150 and it is conveyed that the outflow current of the battery 300 is less than the first threshold value.

S212 of Steps

In the jump start detection circuit 140, since the relay 200 is not disconnected and there is no connection of an external charger for jump start or the like, a voltage less than the second threshold value is detected (no jump start detection). The detection result is obtained by the control circuit 150, and it is conveyed that the voltage of the power supply line 600 is less than the second threshold value.

S213 of Steps

Since the communication with the other control device 500 is disconnected and the outflow current of the battery 300 becomes less than the first threshold value (the dark current is in a settled state) and the voltage of the power supply line 600 is less than the second threshold value, the control circuit 150 transitions itself from the activation state (wake-up) to the stop state (sleep) to stop some functions. Thus, even when the state of the ignition switch cannot be directly detected, the control circuit 150 can be stopped.

[1-2] Second Start-Stop Control Pattern

FIG. 3 is a timing chart for explaining the second start/stop control pattern by the control circuit 150. The second activation/deactivation control pattern triggers the start of communication between the control circuit 150 and the other control device 500.

S301 of Steps

When a user of the vehicle, such as a driver, turns on the ignition switch (IG-ON) to use the vehicle, an IG indicating IG-ON is inputted to the other control device 500.

S302 of Steps

The other control device 500 is activated in response to IG indicating IG-ON. The other activated control device 500 notifies the control circuit 150 of the battery control device 100 that LIN communication via the in-vehicle network such as LIN has started.

S303 of Steps

The control circuit 150 detects LIN opening in response to a notification that LIN communication is started received from the other control device 500.

S304 of Steps

The control circuit 150 recognizes that LIN communication with the other control device 500 has started, and transitions itself from the stopped state (sleep) to the activated state (wake-up) to activate all the functions. Thus, even when the state of the ignition switch cannot be directly detected, the control circuit 150 can be activated.

S305 of Steps

In order to terminate the use of the vehicle, when the user turns off the ignition switch (IG-OFF), an IG indicating IG-OFF is inputted to another control device 500. In response to IG indicating IG-OFF, the other control device 500 notifies the control circuit 150 of the battery control device 100 to start the diagnostic control of the circuit related to the activation.

S306 of Steps

The control circuit 150 performs diagnostic control of the circuit related to the activation, and notifies the result of the diagnosis to the other control device 500. The diagnosis control will be described later with reference to FIG. 5.

S307 of Steps

The other control device 500 notifies the control circuit 150 of the battery control device 100 of the termination of LIN communication via the in-vehicle network after receiving the diagnosis of the circuit related to the activation from the control circuit 150, and stops its own operation.

S308 of Steps

The control circuit 150 detects LIN disconnection in response to a notification that LIN communication received from the other control device 500 is terminated.

S309 of Steps

The control circuit 150 recognizes that the current flowing out (supplied) from the battery 300 to the power supply line 600 becomes less than the first threshold value by the detection of the decrease in the outflow current in the current increase detection circuit 130.

S310 of Steps

The control circuit 150 recognizes that the voltage of the power supply line 600 is less than the second threshold value by detecting no jump start in the jump start detection circuit 140.

S311 of Steps

Since the communication with the other control device 500 is disconnected and the outflow current of the battery 300 becomes less than the first threshold value (the dark current is in a settled state) and the voltage of the power supply line 600 is less than the second threshold value, the control circuit 150 transitions itself from the activation state (wake-up) to the stop state (sleep) to stop some functions. Thus, even when the state of the ignition switch cannot be directly detected, the control circuit 150 can be stopped.

[1-3] Third Start-Stop Control Pattern

FIG. 4 is a timing chart for explaining the third start/stop control pattern by the control circuit 150. This third start-stop control pattern is intended to trigger a change in the voltage of the power supply line 600 in a situation where the relay 200 is interrupted.

S401 of Steps

A user of the vehicle, such as a driver, connects an external charger (not shown) to the power supply line 600 to activate the vehicle. In response to this connection operation, a voltage is generated in the power supply line 600 that becomes the terminal voltage.

S402 of Steps

When the voltage of the power supply line 600 becomes equal to or higher than the second threshold value, the jump start detection circuit 140 detects that a jump start has been performed (jump start detection). The detection result is acquired by the control circuit 150, and it is conveyed that the voltage of the power supply line 600 is equal to or higher than the second threshold value.

S403 of Steps

The control circuit 150 recognizes that the voltage of the power supply line 600 becomes equal to or higher than the second threshold value, and causes the control circuit to transition from the stop state (sleep) to the start state (wake-up) to activate all the functions. Thus, even when the state of the ignition switch cannot be directly detected, the control circuit 150 can be activated.

S404 of Steps

In order to use the vehicle, when the user turns on the ignition switch (IG-ON), an IG indicating IG-ON is inputted to the other control device 500.

S405 of Steps

The other control device 500 is activated in response to IG indicating IG-ON. The other activated control device 500 starts LIN communication with the control circuit 150 of the battery control device 100 via an in-vehicle network such as LIN.

S406 of Steps

In order to terminate the use of the vehicle, when the user turns off the ignition switch (IG-OFF), an IG indicating IG-OFF is inputted to another control device 500. In response to IG indicating IG-OFF, the other control device 500 notifies the control circuit 150 of the battery control device 100 to start the diagnostic control of the circuit related to the activation.

S407 of Steps

The control circuit 150 performs diagnostic control of the circuit related to the activation, and notifies the result of the diagnosis to the other control device 500. The diagnosis control will be described later with reference to FIG. 5.

S408 of Steps

The other control device 500 notifies the control circuit 150 of the battery control device 100 of the termination of LIN communication via the in-vehicle network after receiving the diagnosis of the circuit related to the activation from the control circuit 150, and stops its own operation.

S409 of Steps

The control circuit 150 detects LIN disconnection in response to a notification that LIN communication received from the other control device 500 is terminated.

S410 of Steps

The control circuit 150 recognizes that the current flowing out (supplied) from the battery 300 to the power supply line 600 is less than the first threshold value because the outflow current (increasing or decreasing) in the current increase detection circuit 130 is not detected.

S411 of Steps

After finishing using the vehicle, the user removes the external charger from the power supply line 600. In response to this removal operation, the voltage of the power supply line 600 that becomes the terminal voltage disappears (or decreases).

S412 of Steps

In the jump start detection circuit 140, a voltage less than the second threshold value is detected (no jump start detection). The detection result is obtained by the control circuit 150, and it is conveyed that the voltage of the power supply line 600 is less than the second threshold value.

S413 of Steps

Since the communication with the other control device 500 is disconnected and the outflow current of the battery 300 becomes less than the first threshold value (the dark current is in a settled state) and the voltage of the power supply line 600 is less than the second threshold value, the control circuit 150 transitions itself from the activation state (wake-up) to the stop state (sleep) to stop some functions. Thus, even when the state of the ignition switch cannot be directly detected, the control circuit 150 can be stopped.

[2] Diagnostic Control

Figure 5:
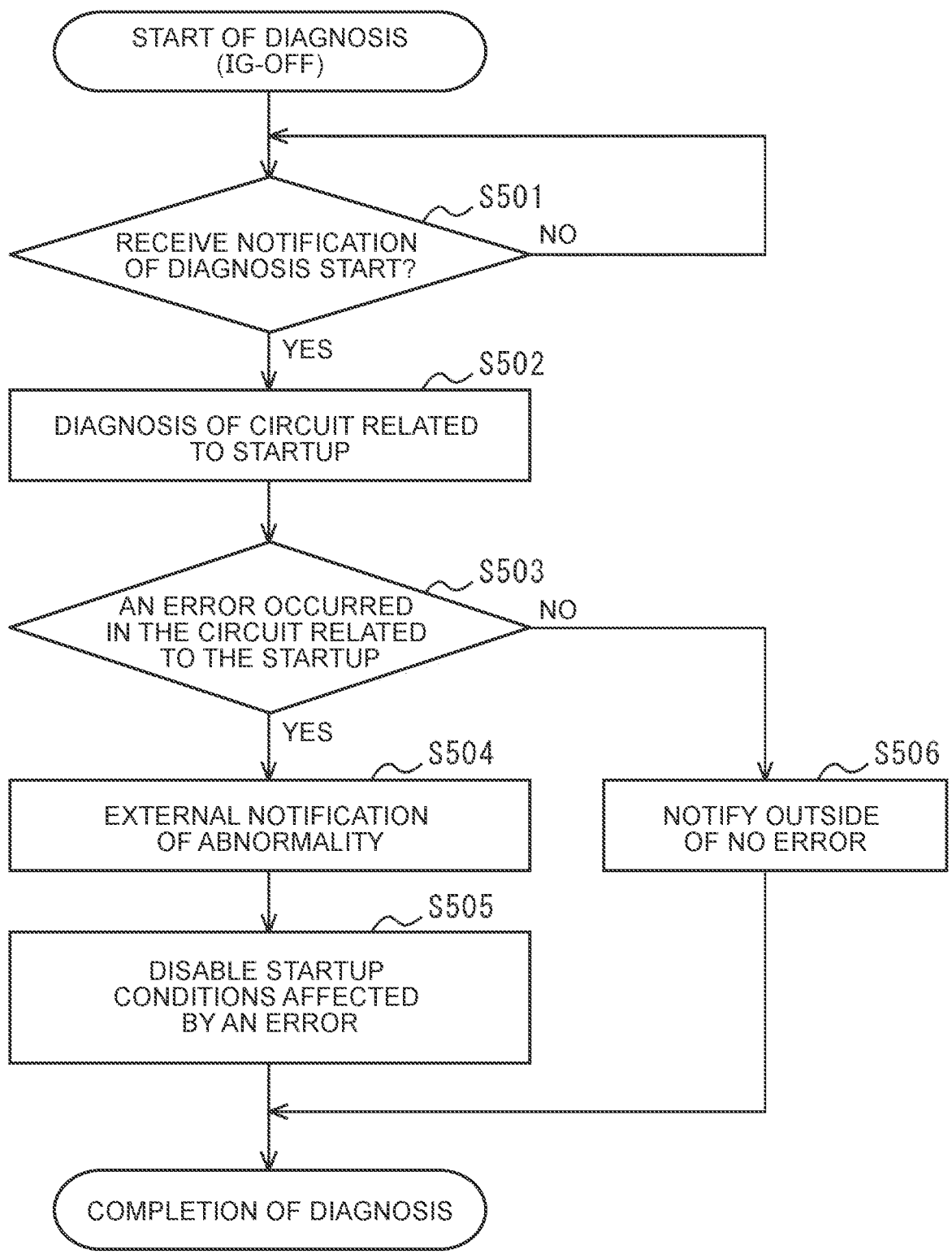
FIG. 5 is a flow chart showing a sequence of a diagnostic process executed by the battery control unit.

With further reference to FIG. 5, a diagnosis control performed by the battery control device 100 according to the present embodiment will be described. FIG. 5 is a flowchart illustrating a processing procedure of diagnostic control of a circuit related to activation executed by each component of the control circuit 150.

The diagnostic control illustrated in FIG. 5 is started after the ignition switch of the vehicle is turned off (IG-OFF).

S501 of Steps

The control unit 152 determines whether or not a diagnosis-start notification based on IG-OFF has been received from another control device 500. The notification of starting the diagnosis is transmitted and received by LIN communication. When the control unit 152 receives the notification of starting the diagnosis (Step S501: Yes), the process proceeds to Step S502.

S502 of Steps

The diagnosis unit 153 performs diagnosis of a circuit related to the activation in response to the notification of the start of diagnosis. The diagnosis unit 153 of the present embodiment performs diagnosis for determining the normality/abnormality of each circuit with respect to the current increase detection circuit 130 and the jump start detection circuit 140 as circuits related to the activation. More specifically, a state in which the input of the current increase detection circuit 130 is turned on and a state in which the input is turned off are forcibly switched, and when the outflow current does not change in response to the switching, it is determined that the current increase detection circuit 130 is abnormal (state is fixed). In addition, a state in which the input of the jump start detection circuit 140 is turned on and a state in which the input of the jump start detection circuit is turned off are forcibly switched, and when the voltage does not change according to the switching, it is determined that the jump start detection circuit 140 is abnormal (state is fixed). When the diagnosis unit 153 performs the diagnosis of the circuit related to the activation, the process proceeds to S503 of steps.

S503 of Steps

As a result of the diagnosis, the diagnosis unit 153 determines whether or not an abnormality has occurred in the circuit related to the activation, that is, the current increase detection circuit 130 and the jump start detection circuit 140. The occurrence of the abnormality is as described above. When the diagnosis unit 153 determines that an abnormality has occurred in the circuit related to the startup (step S503: Yes), the process proceeds to step S504, and when it is determined that an abnormality has not occurred in the circuit related to the startup (step S503: No), the process proceeds to step S506.

S504 of Steps

The notification unit 154 notifies the outside of the battery control device 100 that an abnormality has occurred in a circuit related to activation. The notification may be a content indicating that an abnormality has occurred in a certain circuit, or may be a content indicating one or a plurality of circuits in which an abnormality has occurred. The outside of the battery control device 100 is, for example, another control device 500. The notification of the presence of an error is transmitted and received by LIN communication. When the notification unit 154 notifies the outside of the abnormality, the process proceeds to step S505.

S505 of Steps

The control unit 152 invalidates the activation condition influenced by the circuit having the abnormality. Specifically, in a case where the circuit having an abnormality is the current increase detection circuit 130, the activation condition that the outflow current of the battery 300 is equal to or larger than the first threshold value is affected. Therefore, in this case, the output of the current increase detection circuit 130 is forcibly reduced to zero, and the control circuit 150 is controlled so as not to be activated under the activation condition (activation factor mask). In addition, when the circuit having an abnormality is the jump start detection circuit 140, the activation condition that the voltage of the power supply line 600 is equal to or higher than the second threshold value is affected. Therefore, in this case, the output of the jump start detection circuit 140 is forcibly reduced to zero, and the control circuit 150 is controlled so as not to be activated under this activation condition (activation factor mask). By this activation factor masking process, it is possible to prevent an event in which the process cannot be terminated and the battery 300 is raised while ON is stuck in which current is consumed. When the control unit 152 invalidates the activation condition affected by the circuit having the abnormality, the present diagnosis control ends.

S506 of Steps

The notification unit 154 notifies the outside of the battery control device 100 that no abnormality has occurred in the circuit related to the activation. The notification without any anomaly is transmitted and received by LIN communication. When the notification unit 154 notifies the outside of no abnormality, the present diagnosis control ends.

Operations and Effects

As described above, in the battery control device 100 according to the embodiment of the present disclosure, when it is determined that any one of the activation condition (a) the outflow current of the battery 300 is equal to or greater than the first threshold value, the activation condition (b) the voltage of the power supply line 600 is equal to or greater than the second threshold value, and the activation condition (c) the start of communication with the other control device 500 is satisfied based on the detection signal of the outflow current of the battery 300, the detection signal of the voltage of the power supply line 600, and the communication signal output from the other control device 500 as the predetermined signal, the predetermined function is set to the activation state (wake-up). Further, in the battery control device 100 according to the present embodiment, when it is determined that all of the above-described activation conditions (a), (b) and (c) are not satisfied, the predetermined function is set to the stop state (sleep). Even when the battery control device 100 cannot directly detect the state of the ignition switch by such start/stop control, it is possible to appropriately control the start and stop of the control circuit 150.

In addition, in the battery control device 100 according to the embodiment of the present disclosure, in the diagnostic control of the hardware (HW) circuit related to the activation, when an abnormality such as an abnormal fixing of the current increase detection circuit 130 or the jump start detection circuit 140 that causes the battery control device 100 to continue to operate occurs, a process (a function invalidation, a forced termination, or the like) of masking the activation factor so as not to activate a circuit having an abnormality is performed. By this mask control, wasteful consumption of current by the battery control device 100 can be avoided, and the battery 300 can be suppressed from rising.

Although an embodiment of the present disclosure has been described above, the present disclosure can be regarded as not only a battery control device but also a control method executed by a battery control device including a processor and a memory, a control program of the control method, a computer-readable non-transitory recording medium storing the control program, or a vehicle equipped with a battery control device.

The present disclosure can be used as a battery control device for controlling a battery mounted on a vehicle.

What is claimed is:

1. A battery control device that controls a battery connected to a power supply line via a relay, the battery control device comprising:
    a detection unit that detects a predetermined signal; and
    a control unit that activates a predetermined function of the battery control device when determination is made that any one of three predetermined activation conditions is satisfied, and stops the predetermined function of the battery control device when determination is made that all the three predetermined activation conditions are not satisfied, based on detection of the predetermined signal.

2. The battery control device according to claim 1, wherein:
    the predetermined signal is a current value of the battery; and
    one of the three predetermined activation conditions is that outflow current of the battery becomes equal to or greater than a first threshold value.

3. The battery control device according to claim 1, wherein:
    the predetermined signal is a voltage value of the power supply line; and
    one of the three predetermined activation conditions is that voltage of the power supply line becomes equal to or greater than a second threshold value in a state where the relay is disconnected.

4. The battery control device according to claim 1, wherein:
    the predetermined signal is a communication signal output by another control device; and
    one of the three predetermined activation conditions is that the communication signal is input from the other control device.

5. The battery control device according to claim 2, further comprising a diagnosis unit, wherein:
    the battery control device is mounted on a vehicle;
    the diagnosis unit diagnoses a circuit related to activation after an ignition of the vehicle is turned off; and
    when determination is made that an abnormality occurs in the circuit related to the activation, the diagnosis unit invalidates an activation condition affected by the abnormality.

6. The battery control device according to claim 5, wherein the diagnosis unit determines presence or absence of state fixation in a first electric circuit that detects outflow current of the battery.

7. The battery control device according to claim 5, wherein the diagnosis unit determines presence or absence of state fixation in a second electric circuit that detects voltage applied to the power supply line.

8. A battery control device that is mounted on a vehicle and controls a battery connected to a power supply line via a relay, the battery control device comprising:
    a detection unit that detects a predetermined signal that is a current value of the battery;
    a control unit that activates a predetermined function of the battery control device when determination is made that any one of three predetermined activation conditions is satisfied, and stops the predetermined function of the battery control device when determination is made that all the three predetermined activation conditions are not satisfied, based on detection of the predetermined signal, wherein one of the three predetermined activation conditions is that outflow current of the battery becomes equal to or greater than a first threshold value;
    a notification unit that notifies an electronic control unit of occurrence of the abnormality in the circuit related to the activation when the diagnosis unit determines that the abnormality occurs, wherein the electronic control unit is disposed outside of the battery control device and is configured to control driving of the vehicle; and
    a diagnosis unit that diagnoses a circuit related to activation after an ignition of the vehicle is turned off, and when determination is made that an abnormality occurs in the circuit related to the activation, the diagnosis unit invalidates an activation condition affected by the abnormality,
    wherein the control unit is configured to determine whether a diagnosis-start notification has been received from the electronic control unit, the diagnosis-start notification being sent from the electronic control unit in a case where the electronic control unit acquires a signal indicating that the ignition of the vehicle is turned off, and
    the diagnosis unit is configured to start performing the diagnosis in a case where the control unit has received the diagnosis-start notification.

9. A control method executed by a computer of a battery control device that controls a battery connected to a power supply line via a relay, the control method comprising:
    detecting a predetermined signal;
    activating a predetermined function of the battery control device when determination is made that any one of three predetermined activation conditions is satisfied based on detection of the predetermined signal; and
    stopping the predetermined function of the battery control device when determination is made that all of the three predetermined activation conditions are not satisfied based on the detection of the predetermined signal.

* * * * *